(12) United States Patent
Rowell et al.

(10) Patent No.: US 10,794,472 B1
(45) Date of Patent: Oct. 6, 2020

(54) METHODS FOR INCREASING THE STRENGTH OF AN AUTOMOBILE TRANSMISSION AND KITS AND REPLACEMENT COMPONENTS FOR THE SAME

(71) Applicant: Sonnax Transmission Company, Bellows Falls, VT (US)

(72) Inventors: Brian G. Rowell, Saxtons River, VT (US); Gregg A. Nader, Chester, VT (US)

(73) Assignee: Sonnax Transmission Company, Bellows Falls, VT (US)

( * ) Notice: Subject to any disclaimer, the term of this patent is extended or adjusted under 35 U.S.C. 154(b) by 308 days.

(21) Appl. No.: 15/793,462

(22) Filed: Oct. 25, 2017

Related U.S. Application Data

(60) Provisional application No. 62/412,618, filed on Oct. 25, 2016.

(51) Int. Cl.
| | |
|---|---|
| *F16H 57/08* | (2006.01) |
| *F16D 13/52* | (2006.01) |
| *F16H 3/44* | (2006.01) |
| *F16H 57/00* | (2012.01) |

(52) U.S. Cl.
CPC ............. *F16H 57/08* (2013.01); *F16D 13/52* (2013.01); *F16H 3/44* (2013.01); *F16H 2057/0075* (2013.01); *F16H 2057/087* (2013.01)

(58) Field of Classification Search
None
See application file for complete search history.

(56) References Cited

U.S. PATENT DOCUMENTS

| | | | | |
|---|---|---|---|---|
| 3,776,066 | A * | 12/1973 | Piret | F16H 3/663 |
| | | | | 475/148 |
| 4,014,619 | A * | 3/1977 | Good | F16D 13/52 |
| | | | | 403/359.5 |
| 8,499,600 | B2 * | 8/2013 | Szuba | F16D 13/646 |
| | | | | 29/522.1 |
| 2015/0176659 | A1 * | 6/2015 | Bowman | F16D 25/0638 |
| | | | | 192/112 |
| 2015/0192198 | A1 * | 7/2015 | Suzuki | B60K 17/35 |
| | | | | 180/233 |
| 2018/0031049 | A1 * | 2/2018 | Heitzenrater | F16F 9/306 |

* cited by examiner

*Primary Examiner* — Justin Holmes
(74) *Attorney, Agent, or Firm* — Levenfeld Pearlstein, LLC

(57) ABSTRACT

Methods of modifying a OE prior art transmission, including Ford's AOD, AODE and 4R70W transmissions, to strengthen the transmission by replacing components known to fail. In one example, the intermediate shaft and direct clutch cylinder of an OE transmission are replaced to eliminate the splined connection joining the two components, to simultaneously eliminate the weak splined connection while also making space within the transmission available for an increased diameter shaft. Aspects of the present disclosure also include kits for increasing the strength of a transmission and methods of assembling a transmission.

14 Claims, 7 Drawing Sheets

METHODS FOR INCREASING THE STRENGTH OF AN AUTOMOBILE TRANSMISSION AND KITS AND REPLACEMENT COMPONENTS FOR THE SAME

RELATED APPLICATION DATA

This application claims the benefit of priority of U.S. Provisional Patent Application Ser. No. 62/412,618, filed Oct. 25, 2016, and titled Integral Shaft Drum, which is incorporated by reference herein in its entirety.

FIELD OF THE INVENTION

The present invention generally relates to the field of automobile transmissions. In particular, the present invention is directed to methods for increasing the strength of an automobile transmission and kits and replacement components for the same.

BACKGROUND

The Ford Automatic Overdrive (AOD) transmission was the first domestic automatic transmission with overdrive, making it a 4 speed transmission. It evolved into an AODE model with the addition of electronic controls and a 4R70W model with electronic controls and change of gear ratios. These transmissions and derivatives have found their way into the automotive performance and racing environment, however there are some well-known durability issues. Many of these issues have been resolved with component design improvements in the aftermarket.

FIG. 1 is a cross-sectional view of a prior art original equipment (OE) transmission 100. The term "Original Equipment" and the abbreviation OE, and similar terms, as used herein, refer not only to transmissions and associated parts originally manufactured by a transmission manufacturer or originally sourced by a transmission manufacturer for inclusion in a transmission, but also refers to any aftermarket components conforming to the OE dimensions and specifications, for example, an aftermarket replacement transmission component for replacing a transmission component originally provided in a transmission. Transmission 100 is a Ford AODE transmission. The portion illustrated in FIG. 1 is substantially the same in Ford's AOD, AODE, 4R70W, 4R70E, 4R75W and 4R75E transmissions. Prior art transmission 100 includes a forward clutch drum 102 having an internal spline 104, an intermediate shaft 106 having a first end 108 and a second end 110 and having external splines 112, 114 on the first and second ends, respectively, with external spline 112 configured to mate with forward clutch drum internal spline 104. Transmission 100 also includes a direct clutch cylinder 116, which includes an outer drum 118 and an inner cylinder 120, which are welded together at joint 121. Inner cylinder 120 includes an inner spline 122 that mates with intermediate shaft external spline 114. Drum 118 of direct clutch cylinder 116 is coupled to a direct clutch 124, which includes an interleaved stack of steel elements 126 (only one labeled) and friction elements 128 (only one labeled). When prior art transmission is in $3^{rd}$ and $4^{th}$ gear, torque from forward clutch drum 102 is transmitted to direct clutch 124 via intermediate shaft 106 and direct clutch cylinder 116. Inner cylinder 120 of direct clutch cylinder 116 is slidably disposed over and configured to rotate about output shaft 130. Intermediate shaft 106 and inner cylinder 120 are rotably disposed within a forward sun gear 132, which includes an inner wall 136 that defines a bore of the forward sun gear.

One of the most significant sources of torque limitation in prior art transmission 100 is intermediate shaft 106. Intermediate shaft 106 has a relatively small outer diameter D1 which tends to be undersized, at least for high-stress conditions. In addition to a small diameter D1, intermediate shaft 106 also has significant stress concentrations at external spline 114 where the intermediate shaft couples to direct clutch cylinder 116. These stress concentrations affect the fatigue strength of intermediate shaft 106. Although increasing the size of intermediate shaft 106 and inner cylinder 120 would help increase the strength of the intermediate shaft, such an increase is not possible because of the limited space envelope defined by forward sun gear 132 and other components of the transmission located radially outward from the forward sun gear and inner cylinder 120. Given these space constraints, previous attempts to increase the strength of intermediate shaft 106 have generally focused on developing replacement intermediate shafts with higher strength materials. The weakness of intermediate shaft 106 has limited the ability to use transmission 100 in higher demand applications, such as racing or use with engines with higher specific toque and horsepower output.

SUMMARY OF THE DISCLOSURE

In one implementation, the present disclosure is directed to a method of increasing the strength of an intermediate shaft of an Original Equipment (OE) transmission, the OE transmission including a direct clutch cylinder, and a forward clutch drum having an internal spline. The method includes removing the OE intermediate shaft and direct clutch cylinder; and installing a modified direct clutch cylinder that includes an outer drum fixed to a shaft, the shaft having a first end having an external spline, the external spline having an outer dimension configured and dimensioned to be slidably disposed through a bore of a forward sun gear and operably couple to the OE forward clutch drum internal spline.

In another implementation, the present disclosure is directed to a kit for modifying an OE transmission, the OE transmission including a direct clutch cylinder coupled to an intermediate shaft by a splined connection, and a forward clutch drum having an internal spline. The kit includes a modified direct clutch cylinder for replacing the OE direct clutch cylinder and the OE intermediate shaft to eliminate the splined connection and increase the strength of the transmission, the modified direct clutch cylinder including an outer drum fixed to a shaft, the shaft having a first end having an external spline having an outer dimension configured and dimensioned to be slidably disposed through a bore of a forward sun gear and be operably coupled to the OE forward clutch drum internal spline.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DETAILED DESCRIPTION

Figure 1:
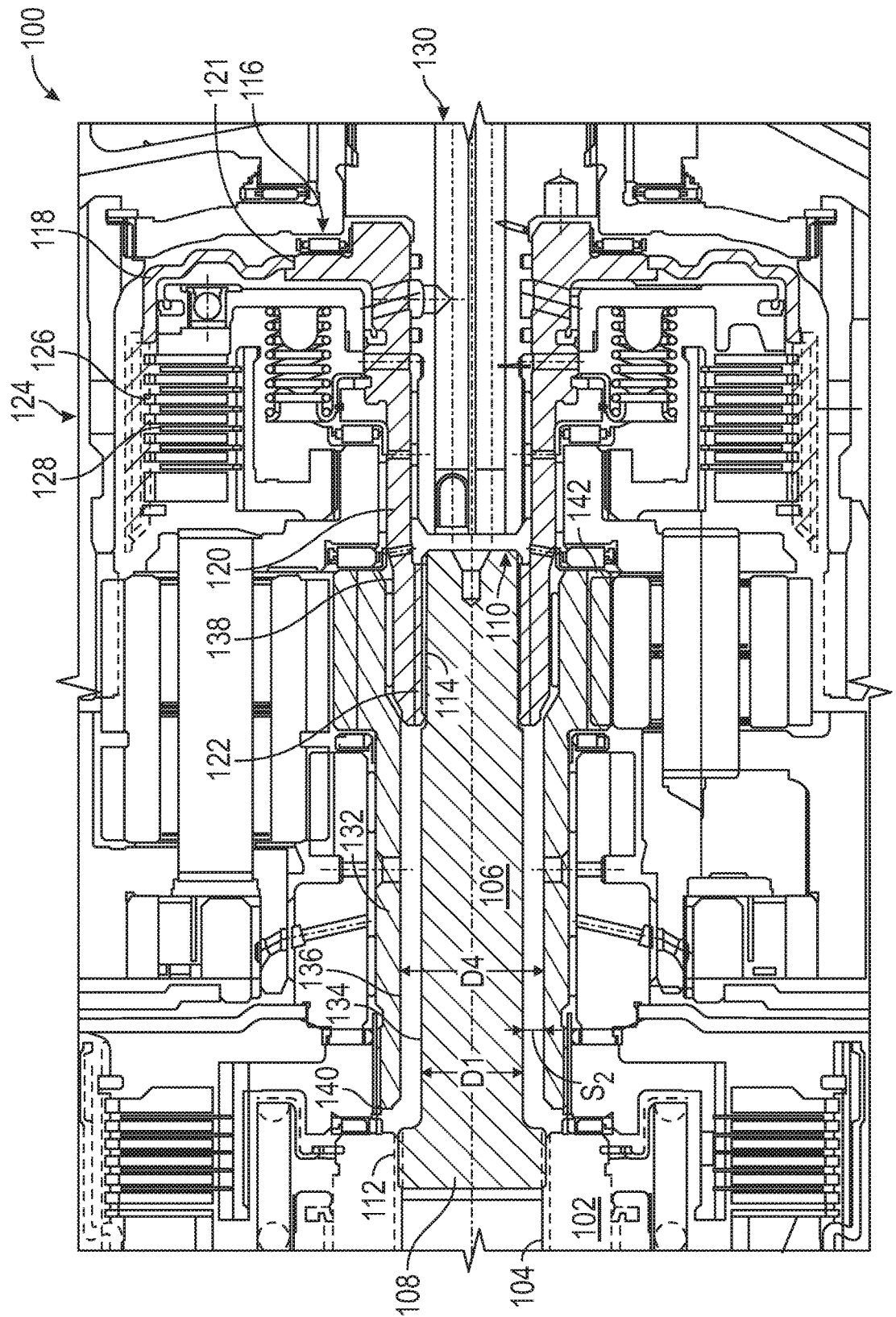
FIG. 1 is a cross-sectional view of a prior art OE transmission, including a forward clutch drum, intermediate shaft, direct clutch cylinder, and forward sun gear.

Aspects of the present disclosure include methods of modifying a OE prior art transmission, including Ford's AOD, AODE and 4R70W transmissions, to strengthen the transmission by replacing components known to fail. In one example, the intermediate shaft and direct clutch cylinder of an OE transmission (e.g., intermediate shaft 106 and direct clutch cylinder 116 (FIG. 1)) are replaced to eliminate the splined connection joining the two components, to simultaneously eliminate the weak splined connection while also making space within the transmission available for an increased diameter shaft. Aspects of the present disclosure also include kits for increasing the strength of a transmission and methods of assembling a transmission.

FIGS. 2-8 illustrate one example of a modified transmission 200 in which the prior art forward sun gear 132, intermediate shaft 106, and direct clutch cylinder 116 (FIG. 1) have been replaced with a modified forward sun gear 201 and a modified direct clutch cylinder 202. In the illustrated example, modified direct clutch cylinder 202 includes an outer drum 204 that is fixed to an extended shaft 206. Shaft 206 includes a first end 208 that includes an external spline 210 configured to mate with internal spline 104 of OE forward clutch drum 102. Unlike prior art intermediate shaft 106, which included external spline 114 (FIG. 1), shaft 206 extends to outer drum 204, and in the illustrated example, is welded to the outer drum at joint 212. Modified direct clutch cylinder 202 and shaft 206, therefore, eliminate the splined connection in prior art transmission 100 between intermediate shaft 106 and direct clutch cylinder 116 at external spline 114 and inner spline 122. The elimination of the splined connection provides the dual benefit of eliminating the stress concentrations present in prior art intermediate shaft 106 discussed above and also opens up space for substantially increasing the size of shaft 206 as compared to intermediate shaft 106 (FIG. 1), such that shaft 206 has a diameter D2 that is greater than prior art intermediate shaft diameter D1. In one example D1 is approximately 0.760 inches, whereas D2 is approximately 1.020 inches.

Shaft 206 includes a second end 214 that includes an inner wall 215 than defines an inner cavity 216 for slidably disposing shaft 206 over OE output shaft 130. An outer wall 218 of shaft 206 includes a forward sun gear bearing surface 220 configured to be slidably disposed against sleeve bearing 222 positioned between the forward sun gear bearing surface and an inner wall 224 of modified forward sun gear 201. Outer wall 218 of shaft 206 also includes a planetary assembly bearing surface 226 configured to be slidably disposed against sleeve bearing 228 positioned between the planetary assembly bearing surface and an inner wall of a planetary assembly 230. Inner wall 224 of modified forward sun gear 201 defines a bore that shaft 206 is rotably disposed within, and inner wall 224 and outer wall 218 of shaft 206 define an annular space 232 that includes a substantially constant spacing 51 between the outer wall 218 and inner wall 224. Embodiments of the present disclosure include a spacing between outer wall 218 and inner wall 224 that is substantially constant at least along an axial portion extending between a first end 234 of modified forward sun gear 201 and bearing surface 220, and in some examples, an axial portion extending between first end 234 and bearing surface 226. Such a constant spacing between outer wall 218 and inner wall 224 can be a result of maximizing an outer diameter of shaft 206. By contrast, a spacing S2 between an outer wall 134 of OE shaft 106 and inner wall 136 of OE forward sun gear 132 (FIG. 1) is substantially larger than spacing S2 (FIG. 2) and larger than a spacing between an outer wall 138 of inner cylinder 120 and inner wall 136, due in part to the presence of the splined connection between intermediate shaft 106 and the inner cylinder (FIG. 1).

Figure 2:
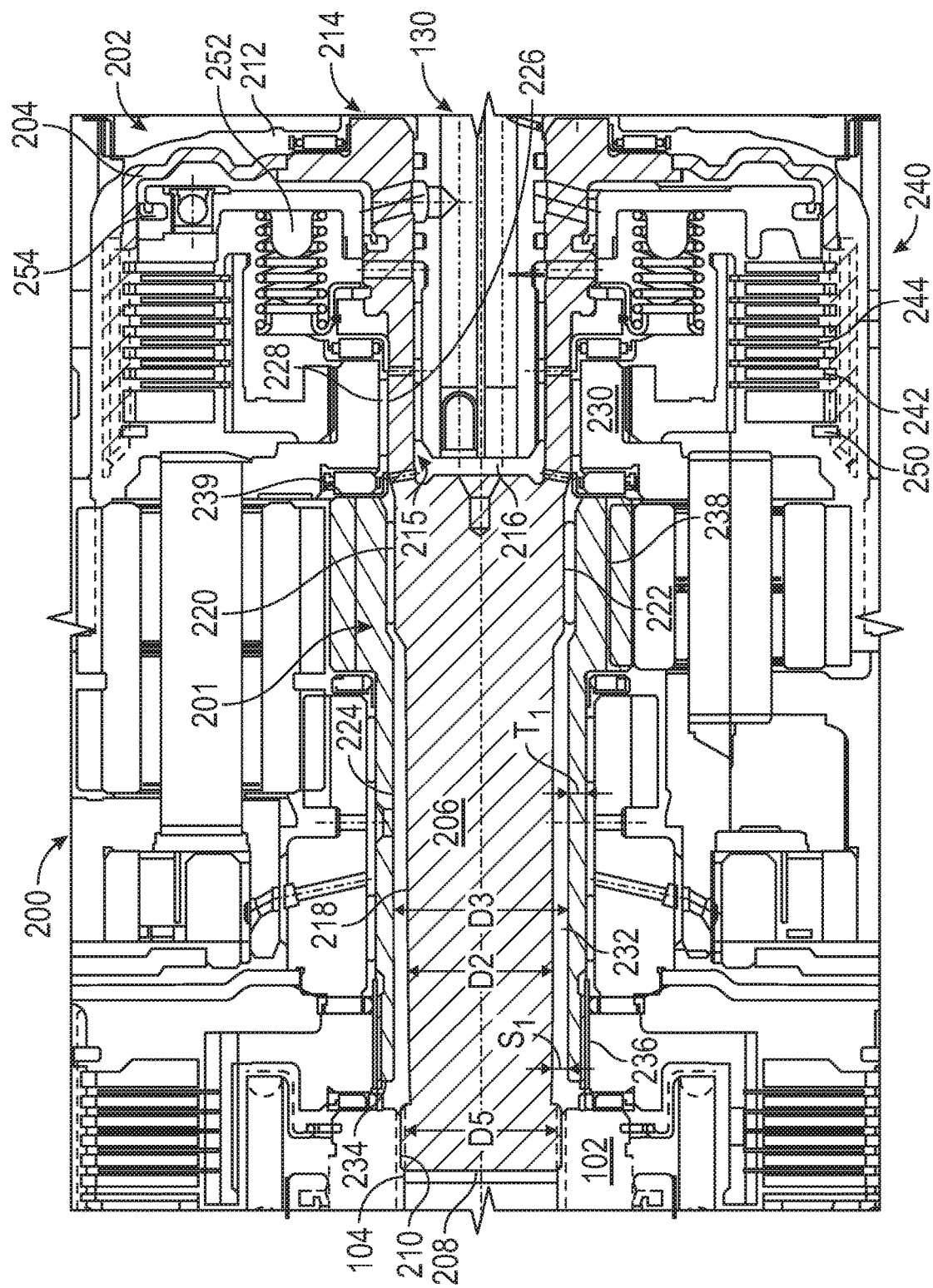
FIG. 2 is a cross-sectional view of a modified transmission, where the OE intermediate shaft and direct clutch cylinder of FIG. 1 have been replaced with an integrally-formed modified direct clutch cylinder with extended shaft.
Figure 3:
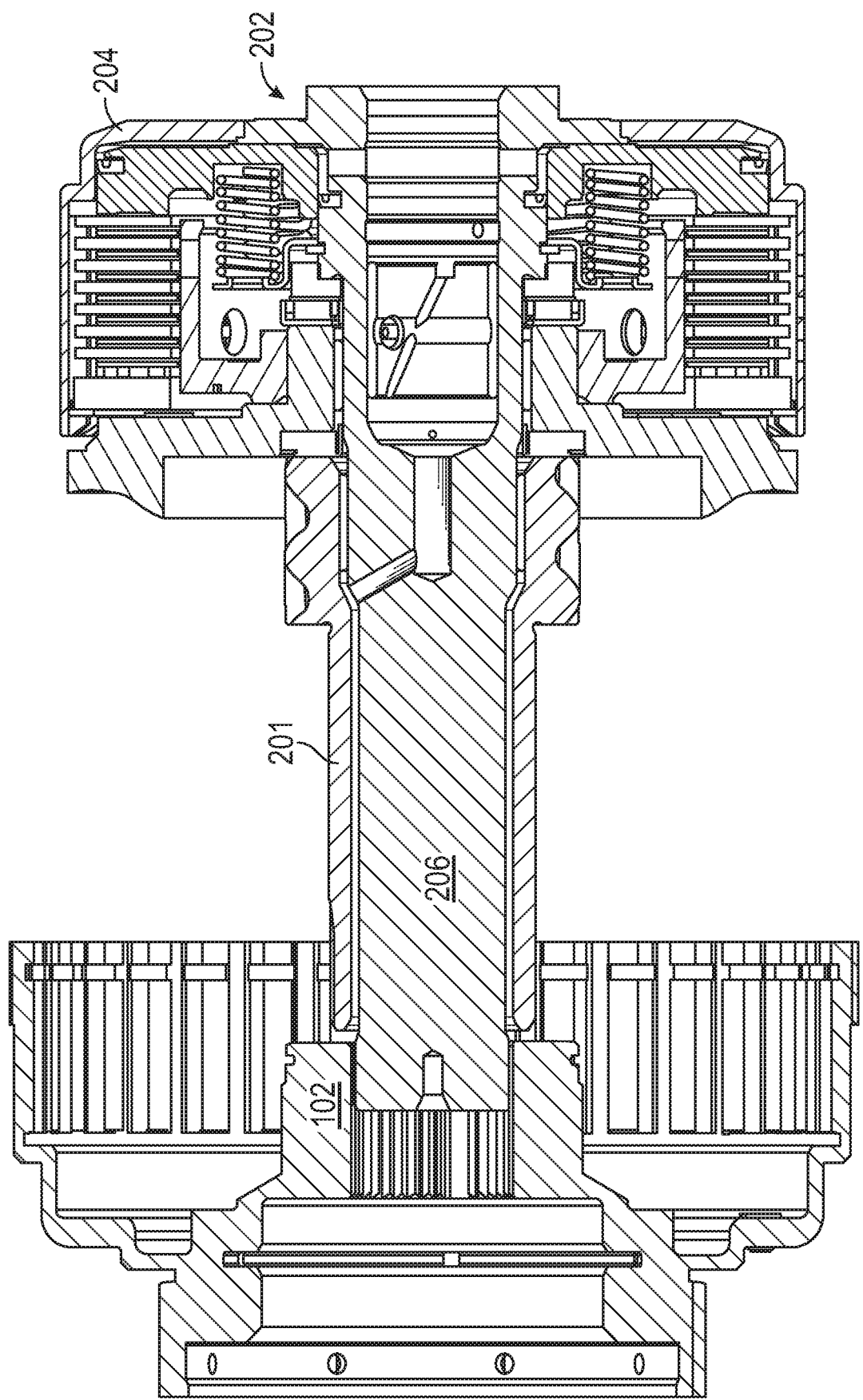
FIG. 3 is a cross-sectional view of the transmission of FIG. 2.
Figure 8:
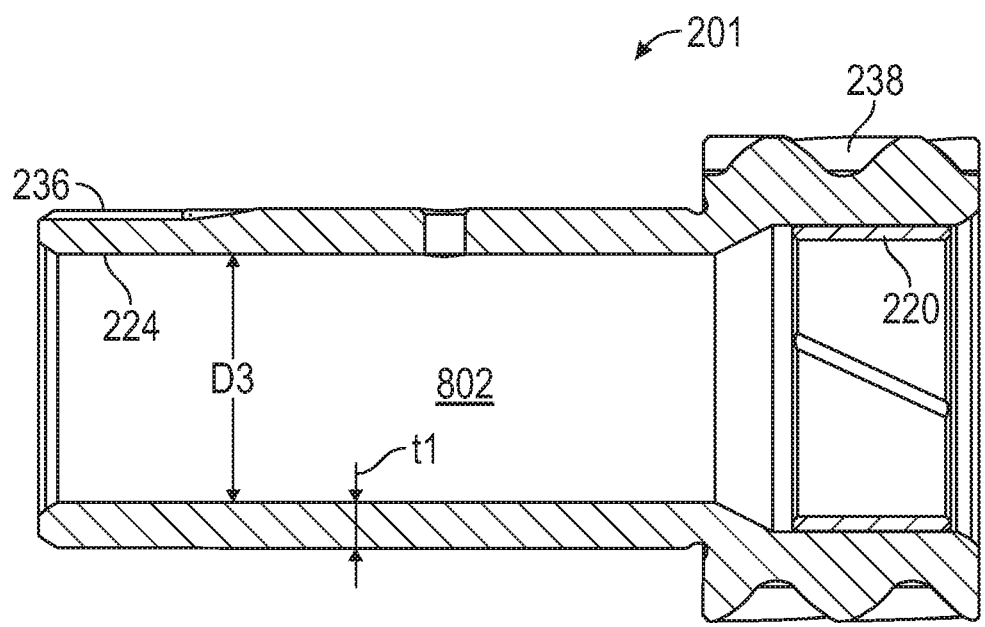
FIG. 8 is a cross-sectional view of the modified forward sun gear of the transmission of FIG. 2.

Referring to FIGS. 1, 2 and 8, in prior art transmission 100, a maximum outer diameter D5 of external spline 112 is greater than an internal diameter D4 of OE forward sun gear 132. During installation, intermediate shaft 106 is inserted into first end 140 of the OE forward sun gear and direct clutch cylinder 116 is inserted into the opposite second end 142 to form a splined connection. As described above, unlike OE transmission 100, transmission 200 includes a single integrally-formed direct clutch cylinder 202 that includes extended shaft 206, which eliminates the separate intermediate shaft 106. Thus, a different assembly procedure is required, where first end 208 of shaft 206 is inserted into second end 239 of modified forward sun gear 201 and passed completely through the modified sun gear to mate with internal spline 104. In the illustrated example, inner wall 224 of modified forward sun gear 201 defines a bore 802 (FIG. 8) having an inner diameter D3 that is larger than an inner diameter D4 of OE forward sun gear 132 (FIG. 1) to allow for first end 208 to pass therethrough. In the illustrated example, the outer dimensions of modified forward sun gear 201 are substantially the same as the outer dimensions of OE forward sun gear 132 (FIG. 1) to enable the installation of the modified forward sun gear into an OE transmission. The increased inner diameter D3 results in a reduced wall thickness t1 as compared to OE forward sun gear 132. Thus, in the illustrated example, modified forward sun gear 201 inner diameter D3 is larger than maximum outer diameter D5 of external spline 210 of shaft 206 to allow for the insertion of shaft 206 into second end 239 of modified forward sun gear 201, through the modified forward sun gear, and out first end 234 of the modified sun gear to engage internal spline 104. In another embodiment, an external spline 210 of shaft 206 may have a maximum outer diameter D5 that is less than inner diameter D4 of OE forward sun gear 132, which would allow for the use of the OE forward sun gear rather than modified forward sun gear 201. In such an example, an insert (not illustrated) may be used between external spline 210 and internal spline 104 of forward clutch drum 102. Thus, in one example, modified forward sun gear 201 with an increased inner diameter D3 may be used to allow for external spline 210 to be substantially the same size as external spline 112 of OE intermediate shaft 106 (FIG. 1). Modified forward sun gear 201 also has a first spline 236 configured to engage a forward clutch hub and gear 238 configured to engage planetary assembly pinion gears.

In the illustrated example, modified transmission 200 also includes a modified direct clutch 240 that includes a plurality of steel elements 242 (only one labeled) and friction elements 244 (only one labeled). In the illustrated example, modified direct clutch 240 includes one additional steel element 242 and friction element 244 than OE direct clutch 124 (7 instead of 6), which increases the holding capacity of the direct clutch. As described more below, the additional steel element 242 and friction element 244 was enabled by increasing a size of modified outer drum 204 as compared to OE outer drum 118. This can be accomplished without requiring modification of other OE components surrounding modified outer drum 204.

Figure 4:
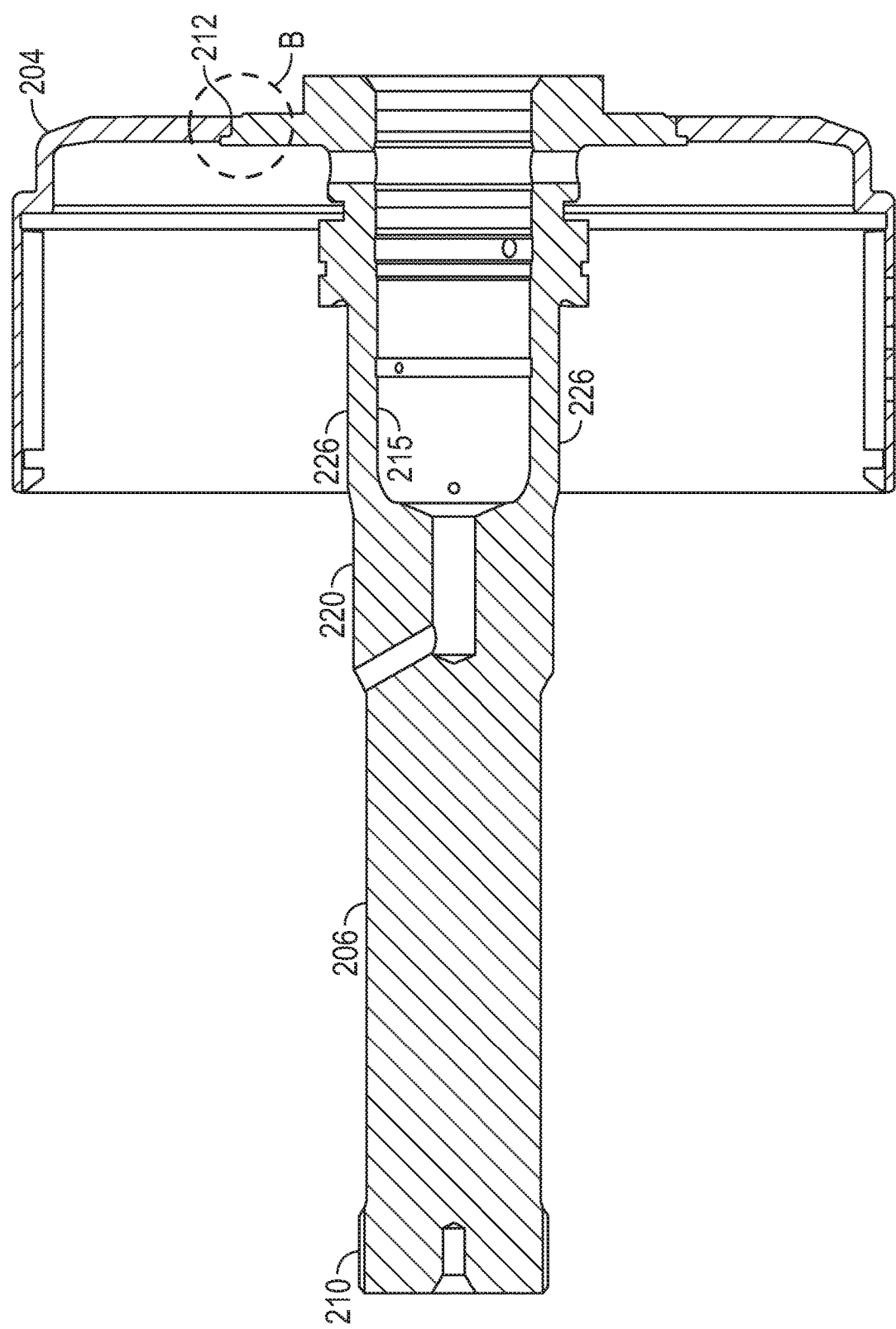
FIG. 4 is a cross-sectional view of the modified direct clutch cylinder of FIG. 2.
Figure 5:
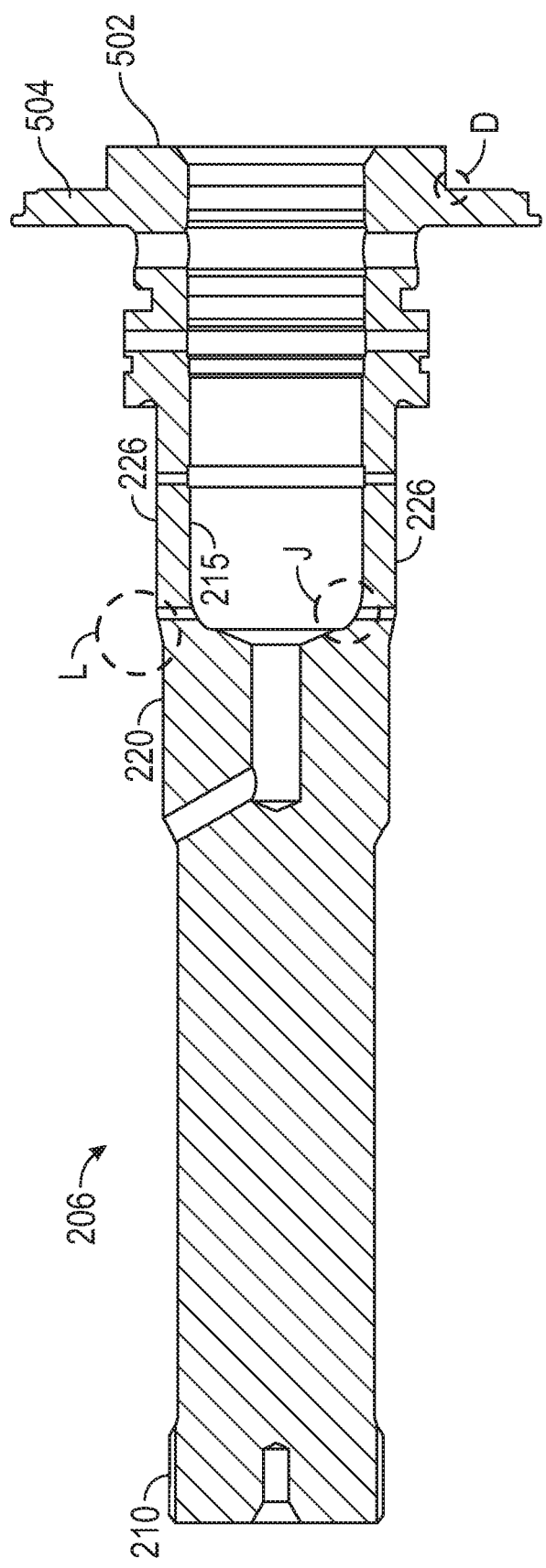
FIG. 5 is a cross-sectional view of the shaft of the modified direct clutch cylinder of FIGS. 2-4.

FIGS. 4-7 show modified direct clutch cylinder 202 in greater detail. As shown in FIG. 4 and described above, in the illustrated example, outer drum 204 and extended shaft 206 are integrally formed and, in this example, consist of two components that are welded together at joint 212. In the illustrated example, a second end 502 of shaft 206 includes a circular flange 504 (FIG. 5) that is configured and dimensioned to mate with an inner wall 602 of outer drum 204 (FIG. 6) to form joint 212. In other examples, a modified outer drum made in accordance with the present disclosure may be formed from a single component or may be formed from three or more components that are fixed together by, e.g., any type of welding or other metal joining technique known in the art.

Figure 7:
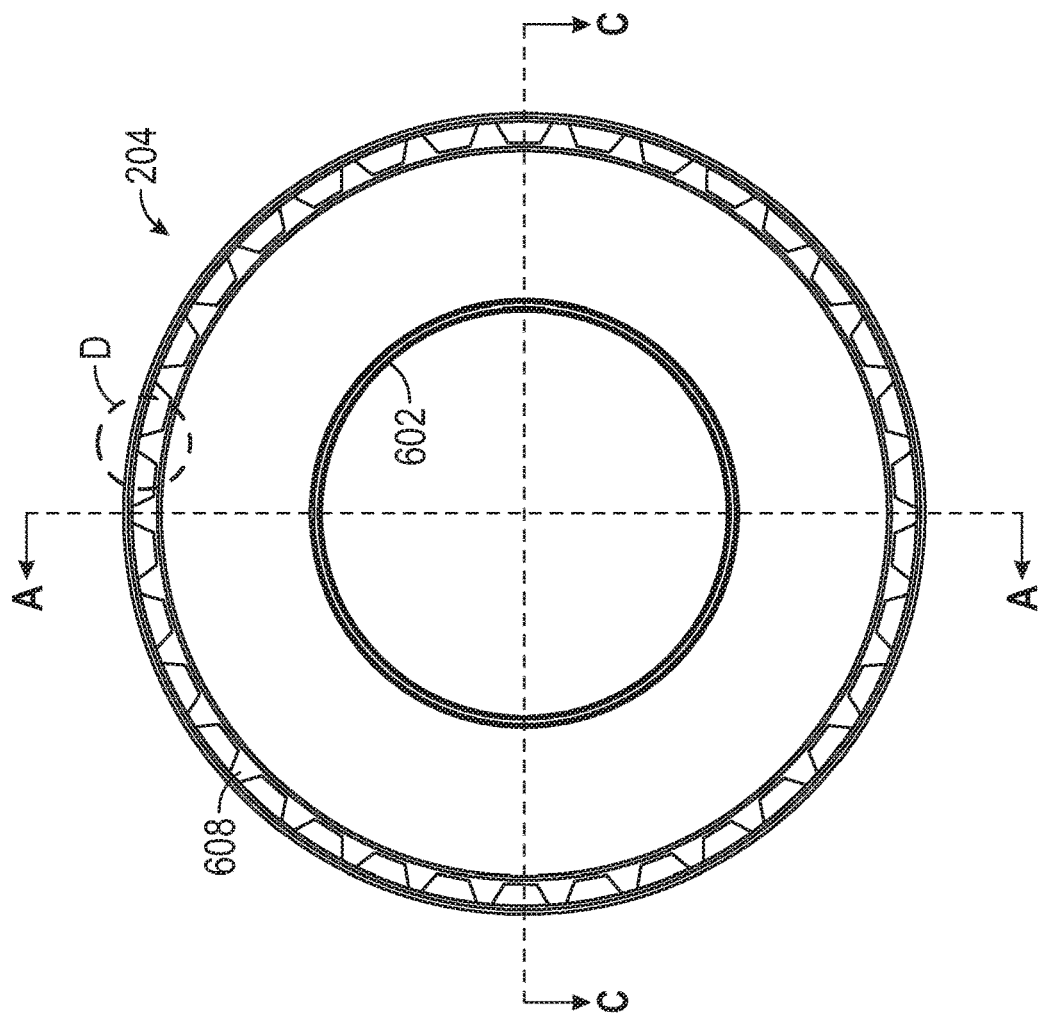
FIG. 7 is a cross-sectional front view of the outer drum of FIG. 6.
Figure 6:
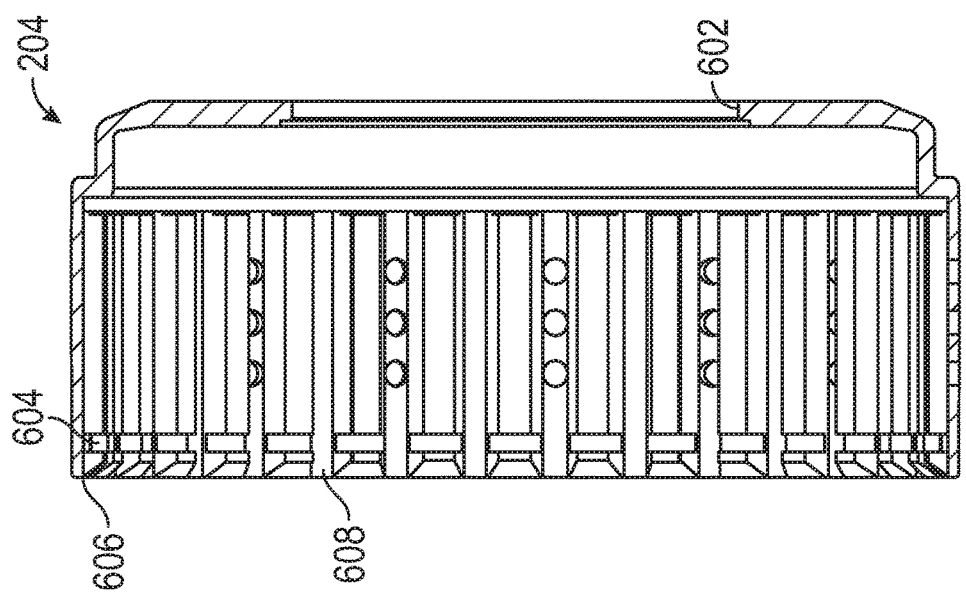
FIG. 6 is a cross-sectional side view of the outer drum of the modified direct clutch cylinder of FIGS. 2-4.

As described above, modified outer drum 204 provides an increased axial length as compared to OE outer drum 118, which allows additional friction and steel elements 242, 244. With reference to FIGS. 2, 6 and 7, in one example, an increased clutch axial length can be provided by one or more of the following modifications: 1) a location of a direct clutch pack retaining ring 250 (FIG. 2) and associated retaining ring slot 604 (FIG. 6) can be moved towards open end 606 of direct clutch outer drum 204; 2) modifying outer drum 204 to allow direct clutch piston 252 (FIG. 2) to sit deeper in the outer drum; 3) repositioning direct piston lip seal 254 (FIG. 2) deeper in the outer drum, which can preserve available travel of the lip seal within the bore of outer drum; 4) redesigning piston 252 to have a shorter overall axial length; and 5) lengthening internal splines 608 (FIGS. 6, 7) of the outer drum that engage external splines of steel elements 242 so the internal splines extend deeper into the outer drum.

FIG. 9 shows an ornamental design of forward sun gear 201; FIGS. 10-14 show an ornamental design of extended shaft 206 of direct clutch cylinder 202; FIGS. 15 and 16 show an ornamental design of direct clutch cylinder outer drum 204; and FIGS. 17-24 show an ornamental design for modified direct clutch cylinder 202. Applicant regards its designs as that shown in the Figures and any and all parts, portions, elements and/or combinations thereof. Color and texture may or may not form part of the claimed design. Applicant reserves the right to claim any part, portion, element and/or combination thereof of the disclosed design, including to replace any solid line with a broken line to disclaim any part, portion, element and/or combination thereof of the disclosed design. Applicant also reserves the right and considers as part of its design a design illustrated with line drawings and appropriate contour lines based on any of the Figures included in the application.

The foregoing has been a detailed description of illustrative embodiments of the invention. It is noted that in the present specification and claims appended hereto, conjunctive language such as is used in the phrases "at least one of X, Y and Z" and "one or more of X, Y, and Z," unless specifically stated or indicated otherwise, shall be taken to mean that each item in the conjunctive list can be present in any number exclusive of every other item in the list or in any number in combination with any or all other item(s) in the conjunctive list, each of which may also be present in any number. Applying this general rule, the conjunctive phrases in the foregoing examples in which the conjunctive list consists of X, Y, and Z shall each encompass: one or more of X; one or more of Y; one or more of Z; one or more of X and one or more of Y; one or more of Y and one or more of Z; one or more of X and one or more of Z; and one or more of X, one or more of Y and one or more of Z.

Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve aspects of the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A method of increasing the strength of an intermediate shaft of an Original Equipment (OE) transmission, the OE transmission including a direct clutch cylinder, and a forward clutch drum having an internal spline, the method comprising:
   removing the OE intermediate shaft and direct clutch cylinder; and
   installing a modified direct clutch cylinder that includes an outer drum fixed to a shaft, the shaft having a first end having an external spline, the external spline having an outer dimension configured and dimensioned to be slidably disposed through a bore of a forward sun gear and operably couple to the OE forward clutch drum internal spline.

2. The method of claim 1, wherein the OE transmission further includes a forward sun gear, the method further comprising:
   removing the OE forward sun gear; and
   installing a modified forward sun gear, the modified forward sun gear having an inner wall having a diameter sized and configured to be greater than the outer dimension of the modified direct clutch cylinder shaft external spline.

3. The method of claim 1, wherein the outer dimension of the external spline is configured and dimensioned to be slidably disposed through a bore of a OE forward sun gear, the method further including providing an insert for operably coupling the external spline to the OE forward clutch drum internal spline.

4. The method of claim 1, wherein the modified direct clutch cylinder shaft has an outer diameter that is greater than an outer diameter of the OE intermediate shaft.

5. The method of claim 1, wherein the modified direct clutch cylinder outer drum and shaft are integrally-formed.

6. The method of claim 1, wherein the OE transmission further includes a direct clutch that includes an interleaved stack of friction elements and steel elements, the method further comprising adding at least one additional friction element or steel element.

7. The method of claim 1, wherein the OE transmission further includes a direct clutch having an interleaved stack of friction elements and steel elements and the OE direct clutch cylinder includes an outer drum, further wherein the modified direct clutch outer drum defines a space that is larger than a space defined by the OE direct clutch cylinder outer drum, the method further comprising installing a greater number of friction elements and/or steel elements in the modified direct clutch outer drum than are in the OE interleaved stack of friction elements and steel elements.

8. The method of claim 1, wherein the shaft has a second end having an inner wall defining an inner cavity configured and dimensioned to be slidably disposed over an OE output shaft.

9. A kit for modifying an OE transmission, the OE transmission including a direct clutch cylinder coupled to an intermediate shaft by a splined connection, and a forward clutch drum having an internal spline, the kit comprising:
a modified direct clutch cylinder for replacing the OE direct clutch cylinder and the OE intermediate shaft to eliminate the splined connection and increase the strength of the transmission, the modified direct clutch cylinder including an outer drum fixed to a shaft, the shaft having a first end having an external spline having an outer dimension configured and dimensioned to be slidably disposed through a bore of a forward sun gear and be operably coupled to the OE forward clutch drum internal spline.

10. The kit of claim 9, further comprising a modified forward sun gear, the modified forward sun gear having an inner wall having a diameter sized and configured to be greater than the outer dimension of the modified direct clutch cylinder shaft external spline.

11. The kit of claim 9, wherein the OE transmission further includes a direct clutch, the kit further comprising at least one friction element or steel element for increasing a number of friction or steel elements in the direct clutch.

12. The kit of claim 9, wherein the OE transmission further includes a forward sun gear, further wherein an outer diameter of the modified direct clutch cylinder shaft is greater than an outer diameter of the OE intermediate shaft and a wall thickness of the modified sun gear is less than a wall thickness of the OE forward sun gear.

13. The kit of claim 9, wherein the outer dimension of the external spline is configured and dimensioned to be slidably disposed through a bore of an OE forward sun gear.

14. The kit of claim 13, further comprising an insert for operably coupling the external spline to the OE forward clutch drum internal spline.

* * * * *